United States Patent
Matters et al.

(10) Patent No.: US 10,628,199 B2
(45) Date of Patent: Apr. 21, 2020

(54) RESTORING AND POWERING-OFF WORKLOADS DURING WORKFLOW EXECUTION BASED ON POLICY TRIGGERS

(71) Applicant: RACKWARE, INC., Fremont, CA (US)

(72) Inventors: Todd Matters, Royersford, PA (US); Aniket Kulkarni, Maharashtra (IN); Sash Sunkara, Dublin, CA (US)

(73) Assignee: RACKWARE, INC, Fremont, CA (US)

( * ) Notice: Subject to any disclaimer, the term of this patent is extended or adjusted under 35 U.S.C. 154(b) by 122 days.

(21) Appl. No.: 15/710,416

(22) Filed: Sep. 20, 2017

(65) Prior Publication Data

US 2019/0087213 A1 Mar. 21, 2019

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,484,208 B1 | 1/2009 | Nelson | |
| 8,352,608 B1* | 1/2013 | Keagy | G06F 8/63 709/226 |
| 8,479,194 B2 | 7/2013 | Rangegowda et al. | |
| 8,819,369 B1* | 8/2014 | Alappat | G06F 9/45558 711/162 |
| 8,819,672 B2 | 8/2014 | Joukov et al. | |
| 2009/0158286 A1* | 6/2009 | Carteri | G06F 9/5038 718/102 |
| 2009/0217265 A1* | 8/2009 | Ishikawa | G06F 9/45504 718/1 |
| 2011/0265084 A1 | 10/2011 | Knowles et al. | |
| 2011/0307531 A1 | 12/2011 | Gaponenko et al. | |
| 2013/0139155 A1* | 5/2013 | Shah | G06F 9/45558 718/1 |

(Continued)

*Primary Examiner* — Benjamin C Wu
(74) *Attorney, Agent, or Firm* — Kunzler Bean & Adamson

(57) ABSTRACT

Apparatuses, methods, systems, and program products are disclosed for workload management and distribution. A method includes parking a virtual instance of a workload in a repository. The workload may be executing in a first virtual environment that is configured with a first set of execution parameters prior to being parked. The method includes receiving a request to unpark the virtual instance of the workload from the repository to a second virtual environment. The method includes unparking the virtual instance of the workload at the second virtual environment. The second virtual environment may be configured with a second set of execution parameters that are different than the first set of execution parameters. The virtual instance of the workload may be unparked at the second virtual environment using the second set of execution parameters such that the unparked virtual instance of the workload retains its operating state from the first virtual environment.

17 Claims, 7 Drawing Sheets

(56) References Cited

U.S. PATENT DOCUMENTS

| | | | |
|---|---|---|---|
| 2013/0185812 A1* | 7/2013 | Lie | G06F 9/45558 |
| | | | 726/29 |
| 2014/0130040 A1* | 5/2014 | Lemanski | G06F 9/4856 |
| | | | 718/1 |
| 2015/0347430 A1* | 12/2015 | Ghosh | G06F 11/1451 |
| | | | 707/649 |
| 2015/0373096 A1* | 12/2015 | Chandrasekaran | H04W 4/023 |
| | | | 709/226 |
| 2016/0048408 A1 | 2/2016 | Madhu et al. | |
| 2016/0246626 A1* | 8/2016 | Kolesnik | G06F 9/45558 |
| 2017/0242725 A1* | 8/2017 | Roth | G06F 9/45533 |

* cited by examiner

RESTORING AND POWERING-OFF WORKLOADS DURING WORKFLOW EXECUTION BASED ON POLICY TRIGGERS

FIELD

This invention relates to computing workloads and more particularly relates to managing, distributing, saving, and restoring computing workloads among various devices.

BACKGROUND

In computing, workloads consist of tasks, sets of instructions, or the like that consume processing cycles of a processor. Workloads, for instance, may include operating system tasks, services, applications, and/or the like. Workloads execute on devices that are configured with different settings such that a workload executing on one device may not be executable on a device with different settings.

SUMMARY

The subject matter of the present application has been developed in response to the present state of the art, and in particular, in response to the problem of, and the need to, manage, distribute, save, and restore computing workloads among various devices that have not yet been fully solved by currently available techniques. Accordingly, the subject matter of the present application has been developed to manage, distribute, save, and restore computing workloads among various devices that overcomes at least some of the above-discussed shortcomings of prior art techniques.

A method for managing and distributing workloads includes parking a virtual instance of a workload in a repository. The workload executes in a first virtual environment that is configured with a first set of execution parameters prior to being parked. The method includes receiving a request to unpark the virtual instance of the workload from the repository to a second virtual environment. The method also includes unparking the virtual instance of the workload at the second virtual environment. The second virtual environment is configured with a second set of execution parameters that are different than the first set of execution parameters. The virtual instance of the workload is unparked at the second virtual environment using the second set of execution parameters such that the unparked virtual instance of the workload retains its operating state from the first virtual environment. The preceding subject matter of this paragraph characterizes example 1 of the present disclosure.

Parking the virtual instance of the workload includes powering-off the virtual instance of the workload, saving one or more incremental recovery points of the virtual instance of the workload while the workload continues to execute, and/or saving a copy of the virtual instance of the workload and deleting the executing virtual instance of the workload. The preceding subject matter of this paragraph characterizes example 2 of the present disclosure, wherein example 2 also includes the subject matter according to example 1, above.

Unparking the virtual instance of the workload includes powering-on the powered-off virtual instance of the workload, restoring the virtual instance of the workload from an incremental recovery point, and/or restoring the virtual instance of the workload from a saved and deleted virtual instance of the workload. The preceding subject matter of this paragraph characterizes example 3 of the present disclosure, wherein example 3 also includes the subject matter according to any one of examples 1 or 2, above.

Parking the virtual instance of the workload is performed in response to user input commanding parking of the virtual instance of the workload, a predetermined schedule, and a predefined policy. The preceding subject matter of this paragraph characterizes example 4 of the present disclosure, wherein example 4 also includes the subject matter according to any one of examples 1-3, above.

The predefined policy defines one or more triggers for initiating parking of the virtual instance of the workload. The one or more triggers include detecting that the workload is inactive for a predefined amount of time, a user logged-off from the workload, a cost threshold for a predetermined amount of time is satisfied, a processing threshold for a predetermined amount of time is satisfied, a memory threshold for a predetermined amount of time is satisfied, and/or a storage threshold for a predetermined amount of time is satisfied. The preceding subject matter of this paragraph characterizes example 5 of the present disclosure, wherein example 5 also includes the subject matter according to any one of examples 1-4, above.

A plurality of policies may be associated with the virtual instance of the workload where each policy has an assigned priority that defines an order in which each policy is applied for parking the virtual instance of the workload. The preceding subject matter of this paragraph characterizes example 6 of the present disclosure, wherein example 6 also includes the subject matter according to any one of examples 1-5, above.

The virtual instance of the workload includes a virtual machine, a virtual container, an operating system, and/or an application. The preceding subject matter of this paragraph characterizes example 7 of the present disclosure, wherein example 7 also includes the subject matter according to any one of examples 1-6, above.

The method also includes parking and unparking the virtual instance of the workload as part of a predefined automated workflow such that the virtual instance of the workload is dynamically parked and unparked as part of the automated workflow. The preceding subject matter of this paragraph characterizes example 8 of the present disclosure, wherein example 8 also includes the subject matter according to any one of examples 1-7, above.

Execution of the predefined automated workflow includes unparking the virtual instance of the workload from the repository, executing one or more applications in the virtual instance of the workload, processing results from the one or more applications, dynamically configuring execution of the workflow based on the application results, and/or parking the virtual instance of the workload in response to the workflow being complete. The preceding subject matter of this paragraph characterizes example 9 of the present disclosure, wherein example 9 also includes the subject matter according to any one of examples 1-8, above.

The method also includes encrypting one or more of the parked virtual instance of the workload and data associated with the parked virtual instance of the workload. The preceding subject matter of this paragraph characterizes example 10 of the present disclosure, wherein example 10 also includes the subject matter according to any one of examples 1-9, above.

The first and second execution parameters include different hypervisors, different physical servers, different operating systems, different software and hardware configurations, and/or different cloud infrastructures. The preceding subject matter of this paragraph characterizes example 11 of the present disclosure, wherein example 11 also includes the subject matter according to any one of examples 1-10, above.

The method also includes configuring the parked virtual instance of the workload to execute on the second virtual environment by translating one or more properties of the virtual instance of the workload that are incompatible with the second virtual environment to one or more compatible properties of the second virtual environment. The preceding subject matter of this paragraph characterizes example 12 of the present disclosure, wherein example 12 also includes the subject matter according to any one of examples 1-11, above.

A system for managing and distributing workloads includes a first virtual environment configured with a first set of execution parameters, a second virtual environment configured with a second set of execution parameters that are different than the first set of execution parameters, and a repository for storing virtual instances of workloads. The repository is communicatively coupled to the first virtual environment and the second virtual environment. The system includes an apparatus that includes a park module that parks a virtual instance of a workload executing on the first virtual environment in the repository. The apparatus also includes a request module that receives a request to unpark the virtual instance of the workload from the repository to a second virtual environment. The apparatus includes an unpark module that unparks the virtual instance of the workload at the second virtual environment using the second set of execution parameters such that the unparked virtual instance of the workload retains its operating state from the first virtual environment. The preceding subject matter of this paragraph characterizes example 13 of the present disclosure.

The park module parks the virtual instance of the workload by powering-off the virtual instance of the workload, saving one or more incremental recovery points of the virtual instance of the workload while the workload continues to execute, and/or saving a copy of the virtual instance of the workload and deleting the executing virtual instance of the workload. The preceding subject matter of this paragraph characterizes example 14 of the present disclosure, wherein example 14 also includes the subject matter according to example 13, above.

The unpark module unparks the virtual instance of the workload by powering-on the powered-off virtual instance of the workload, restoring the virtual instance of the workload from an incremental recovery point, and/or restoring the virtual instance of the workload from a saved and deleted virtual instance of the workload. The preceding subject matter of this paragraph characterizes example 15 of the present disclosure, wherein example 15 also includes the subject matter according to example 13-14, above.

The park module parks the virtual instance of the workload in response to user input commanding parking of the virtual instance of the workload, a predetermined schedule, and/or a predefined policy. The preceding subject matter of this paragraph characterizes example 16 of the present disclosure, wherein example 16 also includes the subject matter according to example 13-15, above.

The system further includes a policy module that generates one or more policies that define one or more triggers for initiating parking of the virtual instance of the workload. The one or more triggers include detecting that the workload is inactive for a predefined amount of time, a user logged-off from the workload, a cost threshold for a predetermined amount of time is satisfied, a processing threshold for a predetermined amount of time is satisfied, a memory threshold for a predetermined amount of time is satisfied, and/or a storage threshold for a predetermined amount of time is satisfied. The preceding subject matter of this paragraph characterizes example 17 of the present disclosure, wherein example 17 also includes the subject matter according to example 13-16, above.

The system also includes a workflow module that executes a predefined automated workflow that includes unparking the virtual instance of the workload from the repository, executing one or more applications in the virtual instance of the workload, processing results from the one or more applications, dynamically configuring execution of the workflow based on the application results, and/or parking the virtual instance of the workload in response to the workflow being complete. The preceding subject matter of this paragraph characterizes example 18 of the present disclosure, wherein example 18 also includes the subject matter according to example 13-17, above.

The system also includes a translation module that configures the parked virtual instance of the workload to execute on the second virtual environment by translating one or more properties of the virtual instance of the workload that are incompatible with the second virtual environment to one or more compatible properties of the second virtual environment. The preceding subject matter of this paragraph characterizes example 19 of the present disclosure, wherein example 19 also includes the subject matter according to example 13-18, above.

A program product for managing and distributing workloads includes a computer readable storage medium that stores code executable by a processor. The executable code includes code to perform parking a virtual instance of a workload in a repository, the workload executing in a first virtual environment that is configured with a first set of execution parameters prior to being parked. The executable code includes code to perform receiving a request to unpark the virtual instance of the workload from the repository to a second virtual environment. The executable code includes code to perform unparking the virtual instance of the workload at the second virtual environment. The second virtual environment is configured with a second set of execution parameters that are different than the first set of execution parameters. The virtual instance of the workload is unparked at the second virtual environment using the second set of execution parameters such that the unparked virtual instance of the workload retains its operating state from the first virtual environment. The preceding subject matter of this paragraph characterizes example 20 of the present disclosure.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
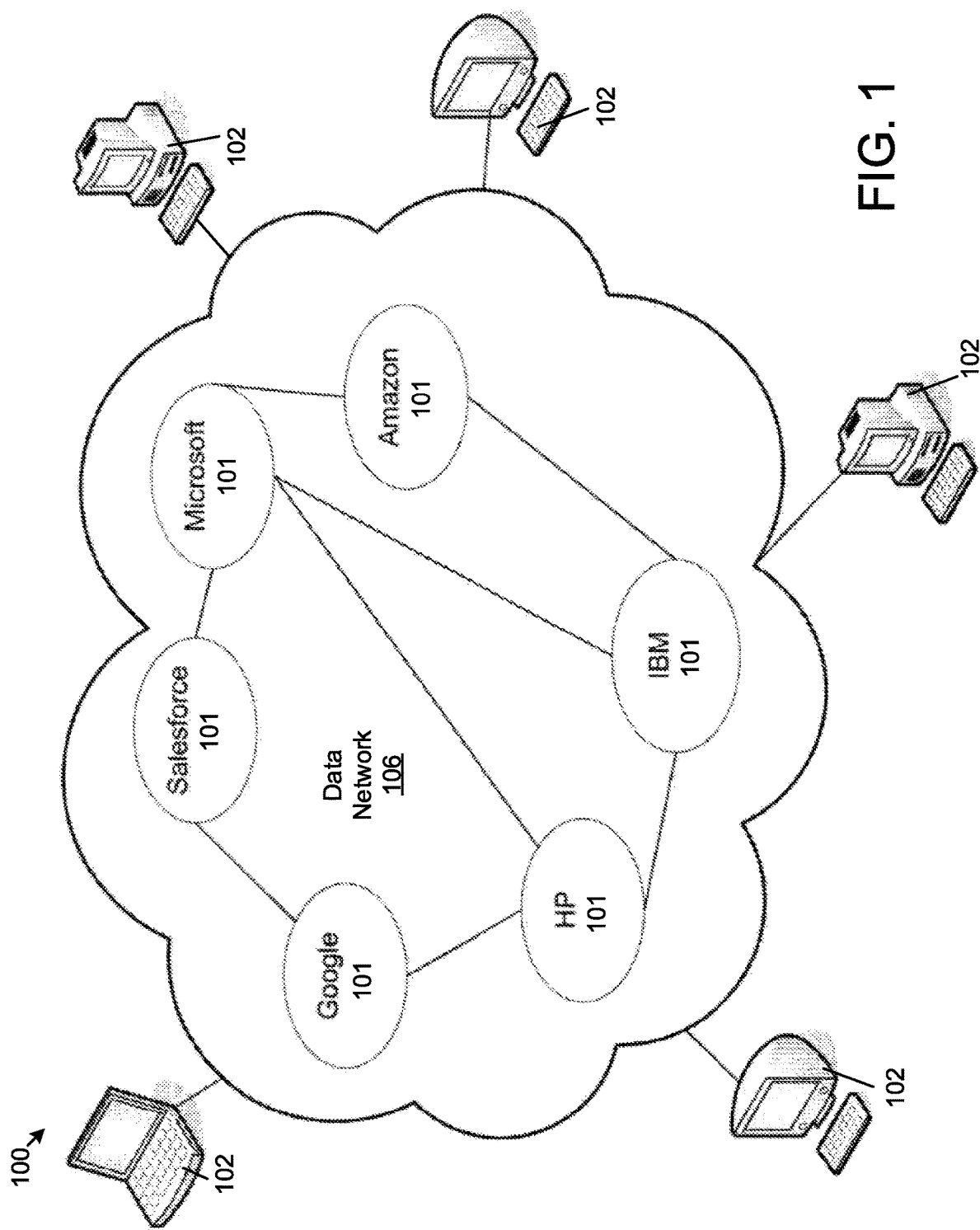
FIG. 1 is a schematic block diagram of one embodiment of a system for workload management and distribution.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

A hypervisor, also called virtual machine ("VM"), allows for the creation of a virtual computer or virtual system. It allows multiple operating systems on each VM to run concurrently on a host computer—a feature called hardware virtualization. Hypervisors present guest operating systems with a virtual platform and monitor the execution of the guest operating systems. In that way, multiple operating systems, including multiple instances of the same operating system, can share hardware resources. Historically, hypervisors provide the ability to consolidate many platforms with VMs. Because of this, several tools were developed to allow conversion between physical hardware resources and virtual hardware resources. However, hypervisors may experience difficulties regarding costs, network issues, disparate interfaces, and performance issues. Furthermore, many applications are not developed with hypervisors in mind. It may be difficult to plan which applications to consolidate onto a single hypervisor as application performance requirements vary over time.

In some embodiments, cloud computing is similar to the use of hypervisors, but provides an additional level of abstraction that solves many of the shortcomings of hypervisors. Cloud computing, as used herein, is Internet-based computing where shared computing hardware resources, software, and information are provided to computers and other devices on demand. Cloud computing describes a consumption and delivery model for IT services involving over-the-Internet provision of resources that provides a layer of abstraction between users and the particular computer hardware being used. Cloud computing infrastructure services deliver computer infrastructure as a service. As such, users no longer need expertise in, or control over, the technology infrastructure that supports them. Rather than purchasing servers, software, data center storage space or network equipment, users can instead purchase those resources as a fully outsourced service on an on-demand basis. Cloud application services, referred to as "Software as a Service" (SaaS), deliver software over the Internet as a service, thus eliminating the need to install and run the application on a user's own systems. The service is typically billed on a utility computing basis based on the amount of resources consumed, where the costs generally reflect the level of activity or usage. Sharing computing resources among multiple organizations or users can improve utilization rates, since servers are not unnecessarily left idle for any extended period of time. This reduces costs significantly and can increase the speed of application development. A side-effect of this approach is that overall computer usage rises dramatically as users no longer have to engineer for peak load limits. In addition, increased high-speed bandwidth makes it possible to receive the same response times from centralized infrastructures at other sites.

Cloud computing frequently takes the form of web-based tools or applications that users can access and use through a web browser as if it were a program installed locally on their own computer. Typical cloud computing service providers deliver common business applications online that are accessed from another web service or software such as a web browser, while the software and data are stored remotely on the servers of the cloud computing service providers or "cloud service providers." One element of cloud computing is customization and the creation of a user-defined experience. Most cloud computing infrastructures consist of services delivered through common centers and built on servers. Clouds often appear as single points of access for all computing needs. Commercial offerings are generally expected to meet quality of service requirements, and typically include service level agreements.

FIG. 1 depicts an example diagram of a cloud computing environment 100. In the illustrated embodiment, various local user cloud client computers 102 are interconnected to one another over a data network 106 through the exemplary cloud service providers 101. Some major cloud service providers include Microsoft, Salesforce.com, HP, IBM, Amazon, and Google.

In one embodiment, the system 100 includes one or more information handling devices 102 or cloud client devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium. An information handling device 102, in one embodiment, may comprise computer hardware or software that utilizes cloud computing for application delivery, or that is specifically designed for delivery of cloud services.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

A "public cloud," as used herein, is defined as computing resources that are dynamically provisioned on a self-service basis over the Internet or other data network 106, via web applications or web services, from an off-site third-party cloud service provider 101 who bills its clients on a utility computing basis, much like electricity usage is billed to public utilities customers. A "private cloud," on the other hand, is a shared infrastructure that may be established within an enterprise having various departments with similar requirements. Cloud computing may require storage of massive volumes of data called "cloud storage," which is a model of networked computer data storage for storing data on multiple virtual servers, generally hosted by third parties, rather than being hosted on dedicated servers. The data center operators "virtualize" resources according to the requirements of their customers and expose them as virtual servers, which the customers can themselves can manage. Physically, the resource may span across multiple servers or storage systems.

Cloud computing, in some embodiments, allows for dynamic placement of workload on dedicated or consolidated servers based on user-defined policies. Because of increased workloads, enterprises have to do a lot of capacity planning upfront to account for peak periods of activity, while at other times, resources may go underutilized. Cloud computing provides a way to avoid this problem of requiring such upfront capacity planning by using cloud resources, which essentially pushes the capacity planning to the cloud computing service providers. From a cloud service provider point of view, having multiple enterprises with differing peak capacity requirements allows for greater capacity planning and optimization because usage among disparate customers is generally amortized over time. The average of capacity peaks over many different enterprises in many cases only requires a finite number of resources. A pay-as-you-go solution that offers compute on demand is a good complement to dedicated and consolidated infrastructure (e.g., hypervisor) in the enterprise. Enterprises currently employ any combination of physical hardware and virtual hardware (e.g., hypervisors or VMs) resources to accomplish computing tasks or workloads.

Each cloud in a cloud computing environment has finite resources; so, if a particular cloud saturates the computational and storage resources of its virtualization infrastructure, it may not be able to satisfy further requests for service allocations. By bridging and managing resources among multiple clouds, hardware computational and storage resources can be managed and optimized across any number of systems or enterprises. This may introduce new business opportunities among cloud providers, but also raises many challenges such as cloud federation, data synchronization, security, interoperability, QoS, monitoring, and billing. Users can access and use these cloud services through a web browser or other network interface as if the services were a program installed locally on their own computer.

Figure 2:
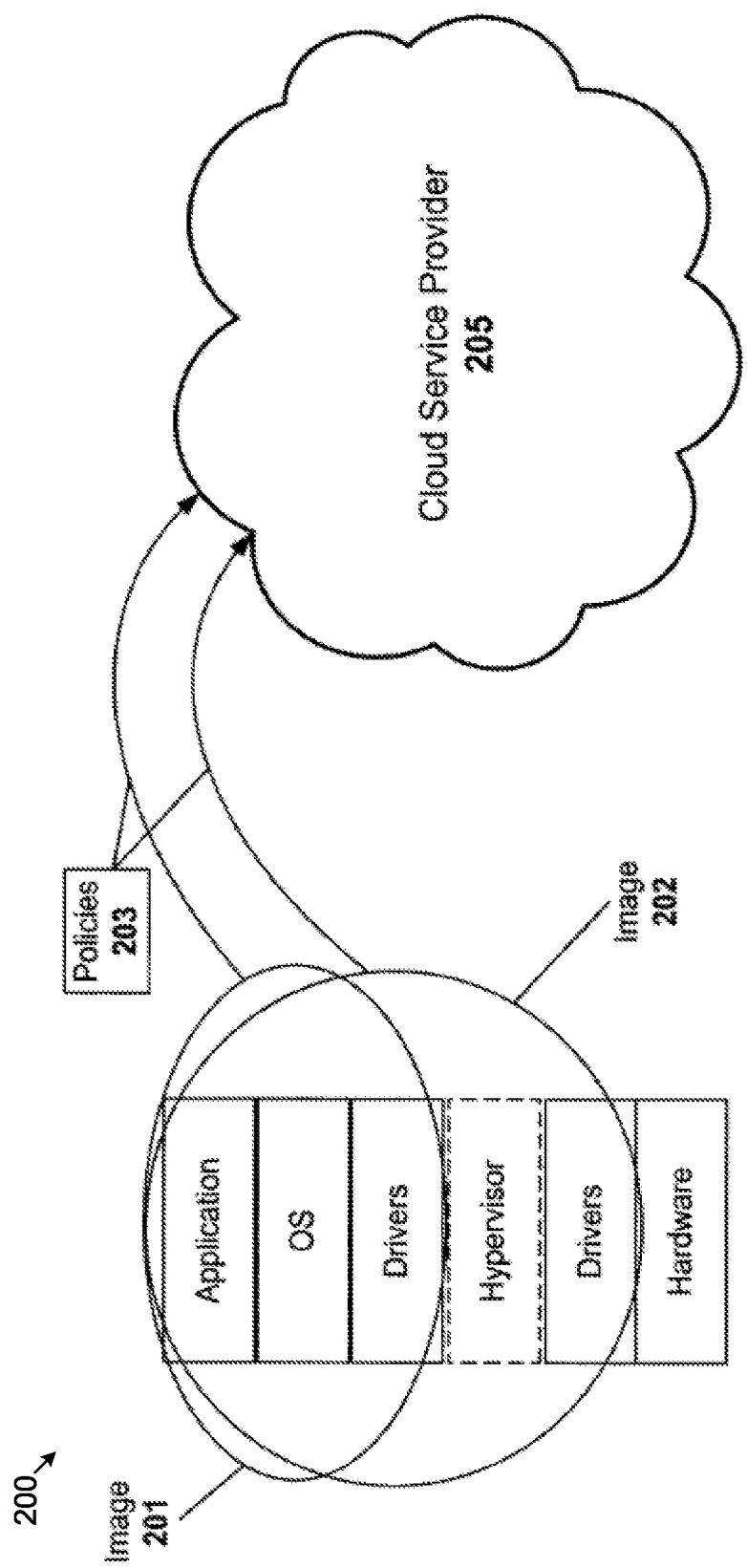
FIG. 2 is a schematic block diagram of one embodiment of another system for workload management and distribution.

To do this, workloads can be decoupled from the underlying hardware and placed in one or more clouds for processing. One technique by which workloads can be decoupled from the underlying system is to define a workload as an "image" (as shown in FIG. 2). An "image," as defined herein, includes an operating system ("OS"), and optionally its overlying application stack, but that has no network identity such as a virtual MAC address or an IP Address. An image may have one or more unique identifiers, e.g., an image name, a universally unique identifier ("UUID"), or the like. An image may optionally include one or more network identifiers such as a virtual MAC address (e.g., in the context of an Ethernet Network), an IP address, or the like. The term "host image" can be used interchangeably with image. A host image may also have a unique identifier. A "cloud image" that has been uploaded into a cloud storage may include an operating system and optionally its overlying application stack. The storage path to the location where the image is located in the cloud may be used to identify the cloud image.

A "system," as used herein, is defined as a hardware platform (virtual or real) capable of running an image. A system may consist of characteristics such as a processor, memory, and other peripherals. A system can be a bare metal server or a VM that exposes the same attributes as a bare metal server. As examples, a system can be identified by one of the MAC addresses of its network card, the address of its service processor, a name, a UUID, or the like. A "host," as defined herein, is any network addressable entity that is comprised of a host image running on a system, possibly within an enterprise environment. A host can be identified by an IP Address, host name, DNS host name, UUID, or the like. A "cloud host," as used herein, is a network addressable entity that is comprised of a cloud image running on a system in the cloud. The system in the cloud can be provisioned by the user at boot time. A cloud host can be identified using the path to its location in the cloud including, but not limited to, a DNS name or an IP address.

FIG. 2 depicts decoupling a workload (image) from its associated hardware system and placing it into a cloud of a particular cloud service provider. This can be accomplished by decoupling the images 201 and 202 from their underlying computing resources such that each image can be placed onto any of a multiplicity of platforms in a seamless manner, whether the platforms be other physical hardware systems (e.g. those having additional bandwidth), hypervisors, or various cloud service providers' platforms 205 as depicted in the illustrated embodiment 200. In addition, the source and destination computing resources may all be contained within an enterprise having one or more data centers within a private cloud such that data is migrated from data center to data center within the enterprise in a seamless manner. In one embodiment, an image may be configured with new capabilities such as network resources, file-system resources, and driver resources that are available to it, prior to migrating the image. The image can be configured when assigned or unassigned to a system. Metadata for the image may also be updated as part of the configuration process. Accordingly, images may be dynamically managed and provisioned based on system requirements.

As shown in FIG. 2, an image 201 can be defined to include an operating system and its associated application stack, as well as any associated drivers, settings (e.g., network settings, configuration settings, user settings, or the like), metadata, or the like stacked on top of the underlying hardware. An image 202 may also be defined to include one or more hypervisors and associated drivers. An image 201/202 can be defined and decoupled from its underlying hardware, and placed onto any other platform, including other physical systems or hypervisors, or into a public or private cloud for efficient use of processing resources. Not only can the image 201/202 be separated from the underlying hardware, but the image bits can also be separated from the metadata about the image 201/202 to enable broad image mobility functions among computing resources in a cloud computing environment.

An image 201/202 may be cloned before or after it is decoupled from its system and placed into one or more clouds, and, as described below, images on a host and in the cloud may be synchronized so that the data of each image is identical, or substantially identical. In addition, one or more policies 203 may also be uniquely defined for each image 201/202 placed in the cloud as shown in FIG. 2. These policies can be tied to various metrics that are important to the business of the customer of the cloud provider. The policies can be, for example, based on time of day, utilization rates, or the like. Images 201/202 can be migrated between physical machines, physical and virtual machines or hypervisors, physical machines and the cloud, virtual machines and the cloud, or any combination of these.

Figure 3:
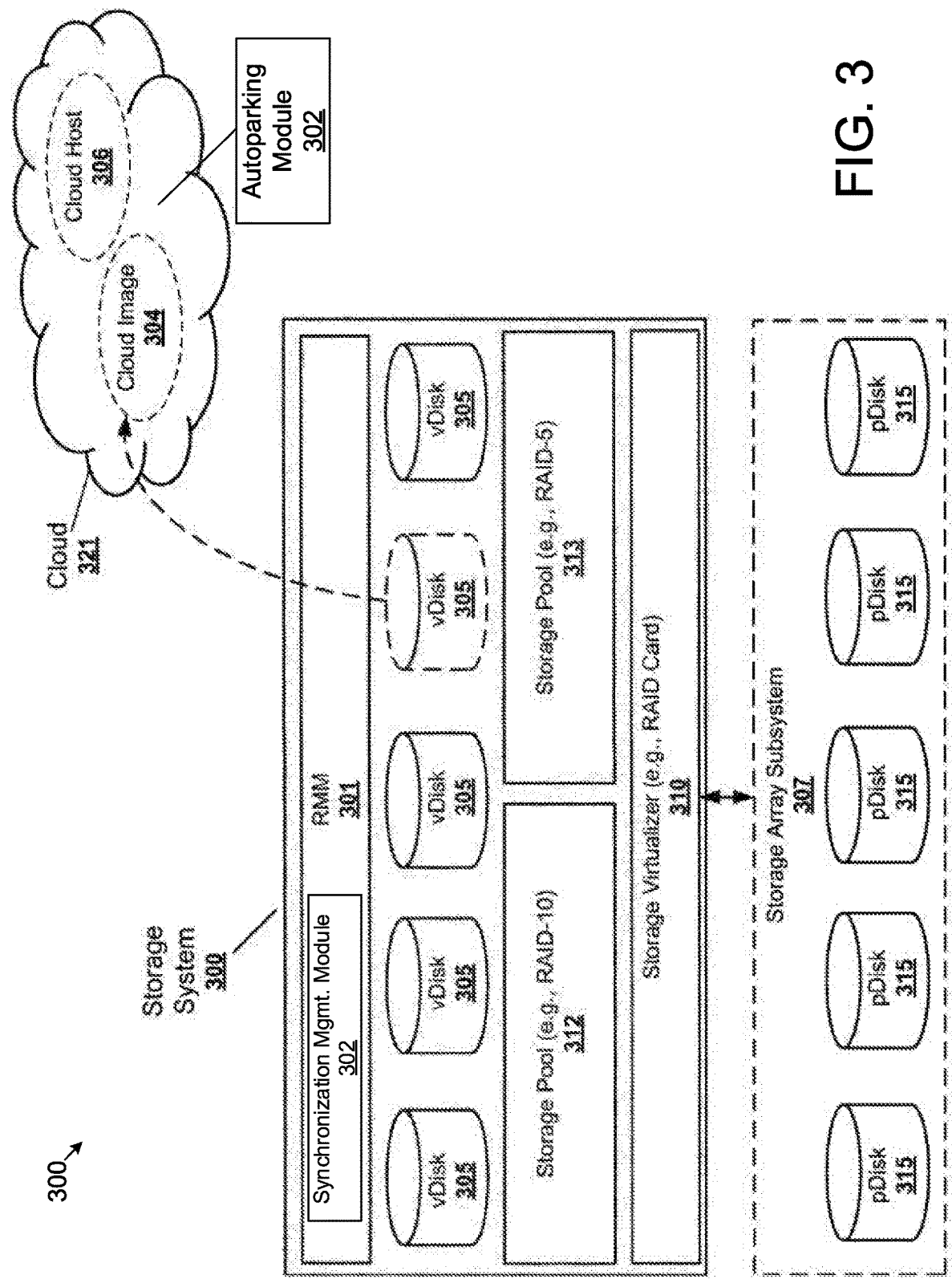
FIG. 3 is a schematic block diagram of one embodiment of yet another system for workload management and distribution.

FIG. 3 depicts an example embodiment of a system for workload management and distribution. In the illustrated embodiment, storage system 300 includes a remote management module ("RMM") 301 in communication with a number of virtual disks ("vDisks") 305 in a storage array. In one embodiment, the RMM 301 can include a Rackware Management Module having migration capabilities across physical, virtual, and cloud platforms developed by Rackware, Inc., Fremont, Calif. vDisks 305 each include a virtual disk of a certain capacity that is carved from one of storage pools 312 or 313. For example, vDisks 305 could be a 40 GB virtual disk created out of a RAID-5 storage pool 313 that has a total capacity of 400 GB. This means that the RAID-5 storage pool would have 360 GB left over which to create the other vDisks 305 in the pool. Each storage pool 312 and 313 comprises a storage virtualizer 310 in conjunction with physical disks ("pDisks") 315 that are present in the storage array subsystem 307. A storage pool 312 and 313 can have the attributes of RAID levels, as well as capacity and other access right policies that are enumerated and maintained by RMM 301. Each pDisk is a physical storage medium that is present in the storage array and can include any nonvolatile hardware storage resources such as conventional magnetic or optical disks, a SAS Drive, a SATA, flash or other solid state memory, or any combination of such devices. The RMM can group these pDisks as resources for a particular storage pool such as a RAID-10 Pool, RAID-5 pool, etc. as discussed above. A storage virtualizer 310 is typically a hardware acceleration device such as a RAID Card. The RAID Card is the main entity through which the storage pools are created out of the pDisks.

The RMM 301, in one embodiment, includes an embodiment of an autoparking module 302. Similarly, one or more devices in the cloud environment 321 may include an instance of the autoparking module 302. In one embodiment, the autoparking module 302 is configured to synchronize host data associated with a first container on a host device with target data associated with a second container on a target device. In such an embodiment, the host device may be a local device, a device located on an organization's premises, or the like, and the target device may be a cloud device, a networked device, or the like.

Images typically do not run by themselves. Instead, they usually interact in a tiered model running as part of the enterprise workload. For example, such a workload may include: (1) a web tier; (2) an application tier; and (3) a database tier. A web tier may present web pages to the user.

The user interacts with the web pages that utilize the application tier. Then, once the user is ready to make a transaction, it will get recorded in the database tier. In addition, when an image is placed in the cloud, a container may be used to bundle these tiers as needed for the task to be accomplished. A container, as used herein, is a fully described set of images (e.g., drivers, settings, applications, or the like), and optionally networking constructs required for their operation, for a host operating system, and their relationships to each other. Performance operations can be applied to the entire container or to individual elements of the container. For example, a container may be used for a particular task requiring two web tiers, three application tiers, and a database tier. These can all be combined together into a container to perform the desired functionality.

Also a policy or group of policies can be associated with each container, just as they can be for individual images. When a container is defined, it can be placed into the cloud to perform the desired functionality, and the results can be tied back to the enterprise using a secure communications medium, such as, for example, a Virtual Private Networks ("VPNs"). Any secured communications medium can be used without departing from the principles underlying the various embodiments. Communications between customers and a particular cloud can be accomplished by message passing across one or more secure communication mediums. Additionally, a container can be split up across multiple service providers. As such, a container can span multiple clouds, which can be integrated together using one or more secure communications mediums.

In certain embodiments, the autoparking module 302 parks, e.g., stores, an instance of a workload that is configured to execute within a first computing environment configured with a first set of execution parameters, receives a request to unpark the instance of the workload on a second computing environment that has different execution parameters than the first computing environment, and unparks the instance of the workload on the second computing environment such that the instance of the workload retains its operating state from the first computing environment. An improvement that the autoparking module 302 provides is a flexible way to store and distribute workloads among different computing environments, e.g., public clouds, private clouds, data centers, and/or a combination of the foregoing, with minimal user configuration or input. In this manner, automated tasks or workflows can be processed that can dynamically use these workloads for performing various steps of the tasks while minimizing computing resource usage and costs.

Figure 4:
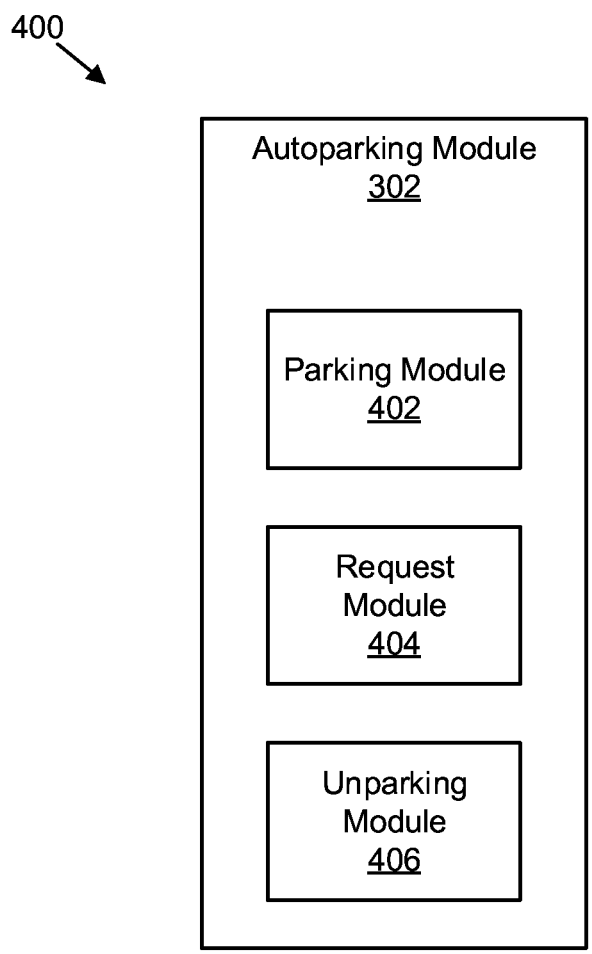
FIG. 4 is a schematic block diagram of one embodiment of a module for workload management and distribution.

FIG. 4 depicts one embodiment of a module 400 for workload management and distribution. In one embodiment, the module 400 includes an instance of an autoparking module 302. The autoparking module 302, in a further embodiment, includes one or more of a parking module 402, a request module 404, and an unparking module 406, which are described in more detail below.

The parking module 402, in one embodiment, is configured to park an instance of a workload in a repository. As used herein, parking a workload may refer to powering-off the workload (e.g., a workload executing from a central location/repository), saving one or more incremental recovery points of the workload while the workload continues to execute, saving a copy of the workload and deleting the executing instance of the workload, and/or the like. In certain embodiments, the workload may be an instance of a virtual workload, e.g., an application, operating system, and/or the like, that executes within a virtual environment, e.g., a virtual machine, a virtual container, and/or the like. In other embodiments, the instance of the workload may be a copy of a state of a workload that is executing within an operating system running directly on hardware of a device, e.g., without a hypervisor or other virtualization technology.

The workload may run in a computing environment that is configured with a first set of execution parameters. For instance, the computing environment may include an environment that is configured with a specific operating system, network settings, storage settings, processor settings, memory settings, and/or the like. Similarly, the computing environment may be a virtual computing environment that is configured with a specific hypervisor or virtualization technologies, virtual operating systems, and/or the like. The computing environment may comprise or otherwise be part of a datacenter that includes physical and/or virtual servers/hypervisors, a cloud computing environment such as a private cloud, a public cloud, and/or a combination of a private and public clouds and datacenters. Thus, when the parking module 402 parks the instance of the workload, the workload may be configured to execute with the settings of the computing environment where it was executing prior to it being parked.

In certain embodiments, the parking module 402 parks the instance of the workload in a repository, which may include cloud storage on the Internet, remote storage on an intranet, a local storage repository, or the like. The parking module 402 may assign an identifier to the parked instance of the workload. Other metadata may also be stored with the parked instance of the workload such as a saved date and/or a last run date, a description of the workload, the configuration settings of the computing environment where the workload was executing, and/or the like.

In some embodiments, the parking module 402 parks the instance of the workload in the repository in response to receiving user input, based on a scheduled event, and/or according to a predefined policy. For example, the user input may include a command to park the instance of the workload received via a command line interface, a graphical user interface, an application programming interface, and/or the like. In another example, the scheduled event may include a scheduled day and time to park the instance of the workload, a scheduled restart of the device that the workload is executing on, and/or the like. In yet another example, the predefined policy may define when, at what intervals, and/or how often the instance of the workload should be parked, what data of the workload should be parked, and/or the like.

The request module 404, in one embodiment, is configured to receive a request to unpark an instance of a parked workload stored in the repository to a second computing environment. In certain embodiments, as used herein, unparking an instance of a workload stored in the repository may include powering-on an instance of the workload from a previously powered-off workload, restoring a workload from a recovery point saved during the execution of a previously saved workload, restoring the workload from a previously saved and deleted workload, and/or the like.

In certain embodiments, the request module 404 receives the request to unpark an instance of a parked workload from the repository via a command line interface, a graphical user interface, an application programming interface, and/or the like. The request may be provided by a user, by a service (e.g., as part of an automated workflow as described in more detail below), an operating system, an application, and/or the like. The request may include an identifier for the parked instance of the workload, a date/time frame for the parked instance of the workload (e.g., the date that the parked instance of the workload was saved), an instance of a workload that includes a particular operating system or application, and/or the like.

In response to the request, the request module 404 locates the requested instance of the workload that is parked in the repository, using the information provided in the request. In one embodiment, the request module 404 sends the parked instance of the workload, or a copy of the parked instance of the workload, to a location, e.g., computing environment, specified in the request. The location may comprise a different computing environment than the computing environment where the parked instance of the workload was created, previously executed, and/or the like.

The unparking module 406, in one embodiment, is configured to unpark the instance of the workload in a new computing environment, which may be a virtual computing environment, e.g., a virtual machine, a virtual container, and/or the like. The new computing environment may comprise or be a part of a datacenter, a private cloud computing environment, a public cloud computing environment, and/or a combination of the foregoing. As described above, unparking a parked instance of a workload may include powering-on an instance of the workload from a previously powered-off workload, restoring a workload from a recovery point saved during the execution of a previously saved workload, restoring the workload from a previously saved and deleted workload, and/or the like.

In another example, the unparking module 406 may receive an instance of a parked workload that the parking module 402 parked at a recovery point. In such an embodiment, the workload may still be executing in a first computing environment, and may also be unparked and executed in the second computing environment from the recovery point. For instance, the parking module 402 may park a virtual machine that is executing in a first computing environment by creating a restore point for the virtual machine and park it in the repository, e.g. save the state of the virtual machine in the repository up to the recovery point while the virtual machine continues to execute in the first computing environment. The unparking module 406 may then download the virtual machine from the repository and restore the virtual machine at the recovery point in a second computing environment that has different configuration settings than the first computing environment.

In a further example, the unparking module 406 may receive an instance of a parked workload that the parking module 402 parked and then deleted the workload from the first computing environment. For instance, the parking module 402 may park a virtual machine that is executing in a first computing environment by saving the operating state of the virtual machine, saving it in the repository, and deleting the virtual machine from the first computing environment. The unparking module 406 may then download the virtual machine from the repository and restore the virtual machine in a second computing environment that has different configuration settings than the first computing environment.

In certain embodiments, the computing environment where the unparking module 406 unparks the workload is configured with execution parameters that may be different than the execution parameters of the computing environment where the workload was created, previously executed, and/or the like. For instance, the computing environment where the workload is unparked may include different hypervisor or virtualization settings, different network/memory/processor/storage characteristics or specifications, different operating systems/applications/drivers/services, and/or the like. In such an embodiment, the unparking module 406 determines a translation or mapping of the workload's configuration settings and metadata to the configuration settings of the computing environment where it is being unparked, as described in more detail below.

In each of the scenarios described above, the unparking module 406 provisions, restores, or otherwise executes the instance of the workload from the repository to the second computing environment such that the instance of the workload retains its operating state from the first computing environment, even though the second computing environment has different execution settings or parameters than the first computing environment, as described in more detail below. In this way, workloads may be distributed among various computing environments that have different configurations with little or no configuration by a user.

Figure 5:
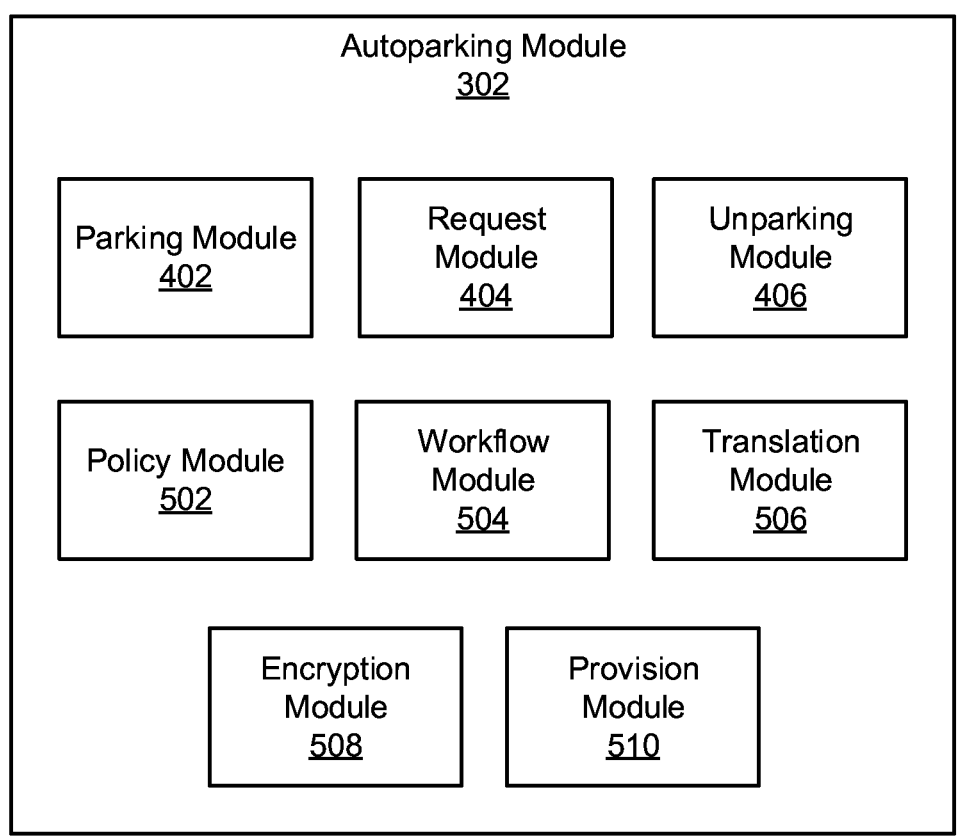
FIG. 5 is a schematic block diagram of one embodiment of another module for workload management and distribution.

FIG. 5 depicts one embodiment of a module 500 for workload management and distribution. In one embodiment, the module 500 includes an embodiment of an autoparking module 302. The autoparking module 302, in some embodiments, includes one or more of a parking module 402, a request module 404, and an unparking module 406, which may be substantially similar to the parking module 402, the request module 404, and the unparking module 406 described above. In a further embodiment, the autoparking module 302 includes one or more of a policy module 502, a workflow module 504, a translation module 506, an encryption module 508, and a provision module 510, which are described in more detail below.

The policy module 502, in one embodiment, is configured to manage, maintain, create, store, distribute, and/or the like policies for parking and unparking workload instances. For example, a policy may define the triggers that cause an instance of a running workload on a first computing environment to be parked, and/or an instance of a parked workload to be unparked on a second computing environment. The policy module 502, in certain embodiments, may be embodied as a policy manager or service that actively monitors for conditions that satisfy triggers defined in one or more policies for parking or unparking a workload.

For example, a policy for parking an instance of a workload may include determining that the workload has been inactive for a predefined period of time. The policy module 502 may actively track the activity of the workload, and how long the workload is inactive, to determine whether the amount of time that the workload is inactive satisfies the predefined period of time defined in the policy. If the policy module 502 determines that the time that the workload is inactive satisfies the predefined amount of time specified in the policy, then the parking module 402 may park an instance of the workload in the repository.

Other triggers that initiate parking or unparking a workload may include detecting that a user logged-off from the workload, or is otherwise no longer actively using the workload; detecting that the user logged-on to use the workload; determining that a cost threshold associated with a predetermined amount of time is satisfied (e.g., if there is a fee associated with an amount of time that the workload, or the resources associated with a workload, is used); determining that a processing or CPU usage threshold is satisfied; determining that a memory usage threshold is satisfied; and determining that a storage threshold is satisfied. The various usage thresholds for the computing resources may be actual usage (e.g., processing cycles, storage amounts, etc.), an amount of time that the resources are used, and/or the like.

A policy may also define how the instance of the workload should be parked. For instance, a policy may specify that when certain triggers are detected, the workload should be powered-off, but when other triggers are detected, a restore point for the workload should be created and saved. Furthermore, the user may assign priorities to policies so that if multiple policies are associated with a workload, the policy module 502 will examine the policies in order of their priorities. For example, a policy that specifies that a workload should be powered-off after a cost threshold is satisfied may be given a higher priority than a policy that specifies that a restore point for the workload should be created when the workload is inactive for a predetermined period of time.

In certain embodiments, the policy module 502 receives input from a user to define the triggers in the policy that cause a workload to be parked or unparked. In other words, a user may define the parameters that cause the workloads to be parked and unparked. In a further embodiment, the policy module 502 is located on a computing environment where a workload is running. In further embodiments, the policy module 502 is located on a remote device communicatively coupled to the computing environment where a workload is running. In certain embodiments, the policy module 502 stores policies in a central repository, with a parked workload, as part of an executing workload, and/or the like. Policies may be defined as services, as configuration files, as scripts, and/or the like.

In one embodiment, the workflow module 504 is configured to dynamically, in real-time, park and/or unpark an instance of a workload as part of a predefined automated workflow. As used herein, a predefined automated workflow is a set of instructions, commands, processes, and/or the like that are executed in a sequential order to perform a predefined task, job, and/or the like. As part of the predefined workflow, the workflow module 504 unparks and/or parks instances of workloads to be used during the automated workflow.

For instance, the workflow module 504 may determine what a workflow requires to complete the task that the workflow is designed to perform. Accordingly, the workflow module 504 may determine one or more workloads that are parked in the repository that provide applications, programs, operating systems, services, and/or the like that will help perform the task that the workflow is designed to perform. The workflow module 504 may request one or more parked workloads from the repository, unpark the workloads, execute one or more applications within the unparked workloads, process the results from the one or more applications, dynamically configure execution of the workflow (for the current workflow and/or for future workflows) based on the application results, and then park the workload back to the repository in response to the workflow being complete.

For example, if the workflow is associated with a development environment that includes source control and bug tracking systems. A workflow may be designed, or customized by a user, to run 2,000 automation tests per week. Thus, every Monday morning, for example, the workflow module 504 may download a parked instance of a workload associated with the automation testing, and provision a server (e.g., a virtual machine) or other computing environment, for the automation testing using the downloaded instance of the workload. In particular, the workflow module 504 may provision a build system on a server by unparking the instance of the workload, pull in source code from the source control system, build one or more executable files, provision multiple other servers to perform automated testing of the executable files on the servers, process the results, refine the workflow based on the results of the automation testing (e.g., based on bugs or issues detected in the source code during the build process and/or the testing of the executable files), and then park the workload instances that were used to provision the servers to the repository.

In certain embodiments, the policy module 502 defines one or more policies for scheduling and configuring various workflows, including parked workload instances that may be downloaded and unparked during the execution of the workflow. For example, the policies may define when and how often various automated workflows should be processed, how long workflows should be run, which workloads are associated with the workflows and when they should be unparked and parked, and so on.

The translation module 506, in one embodiment, translates, maps, and/or the like configuration settings, properties, and/or the like for a parked workload that are incompatible with a computing environment where the parked workload is being unparked to corresponding configuration settings for the computing environment. For instance, the parked workload may be a virtual machine created and/or configured with settings for a first virtualization platform, and the computing environment where the virtual machine is being unparked may be configured with different settings that correspond to a second virtualization platform. The translation module 506 may maintain a database of corresponding settings between different virtualization platforms, different operating systems, different hardware devices, and/or the like. Thus, when the unparking module 406 unparks a parked workload on a computing environment that is different than the computing environment where the workload was initially configured, the translation module 506 may be used to map the configuration settings for the workload to the configuration settings for the computing environment where the workload is being unparked.

In one embodiment, the encryption module 508 is configured to encrypt the parked instances of the workloads while they are stored in the repository. Furthermore, the encryption module 508 may encrypt any data, metadata, files, or the like that are associated with the parked instances of the workloads while the workloads are executing and/or while the workloads are parked. In some embodiments, the encryption module 508 encrypts the parked workloads and/or the data associated with the workloads while the parked workloads are transmitted to/from the repository from/to the computing environments. The encryption module 508 may use various encryption algorithms to encrypt the workloads, as one of skill in the art would be familiar with.

In one embodiment, the provision module 510 is configured to provision one or more computing environments for unparking workloads from the repository. The computing environments, for example, may include different virtual environments, such as different hypervisors, different virtualization software, different virtual machines, different virtual containers, and/or the like, which may be configured to unpark, provision, and/or execute one or more parked workloads. The provision module 510, for instance, may issue various commands for provisioning and configuring virtualization environments, operating systems, devices, and/or the like for executing a parked workload from the repository.

The provision module 510 may configure or provision various physical devices (e.g., datacenter servers), various virtual environments, various networks (e.g., different public, private, or combination of private and public clouds), and/or the like that together comprise the computing environment. The provision module 510 may set parameters, variables, settings, and/or the like of the devices and networks of the computing environment so that it is configured for unparking and executing parked workloads, automated workflows that include the parked workloads, and/or the like.

Figure 6:
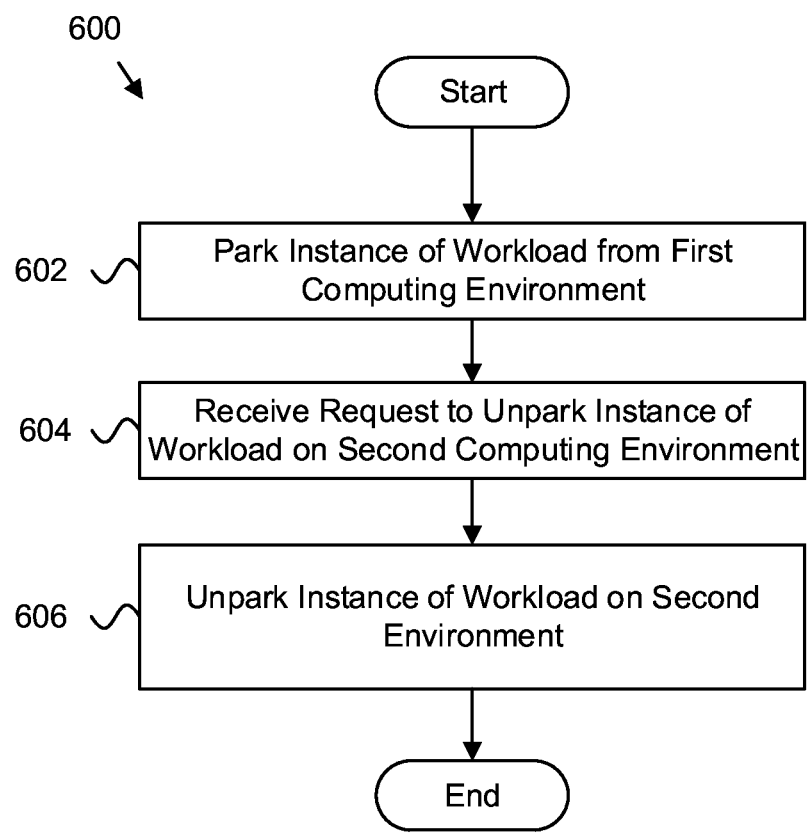
FIG. 6 is a schematic flow chart diagram of one embodiment of a method for workload management and distribution.

FIG. 6 is a schematic flow chart diagram illustrating one embodiment of a method 600 for workload management and distribution. In one embodiment, the method 600 begins and parks 602 an (virtual) instance of a workload in a repository. The workload may execute in a first computing (virtual) environment that is configured with a first set of execution parameters prior to being parked in the repository. In a further embodiment, the method 600 receives 604 a request to unpark the instance of the workload from the repository to a second computing (virtual) environment.

The method 600, in some embodiments, unparks 606 the instance of the workload at the second computing environment. The second computing environment may be configured with a second set of execution parameters that are different than the first set of execution parameters. The instance of the workload may be unparked at the second computing environment using the second set of execution parameters such that the unparked instance of the workload retains its operating state from the first computing environment, and the method 600 ends. In some embodiments, the parking module 402, the request module 404, and the unparking module 406 perform one or more steps of the method 600.

Figure 7:
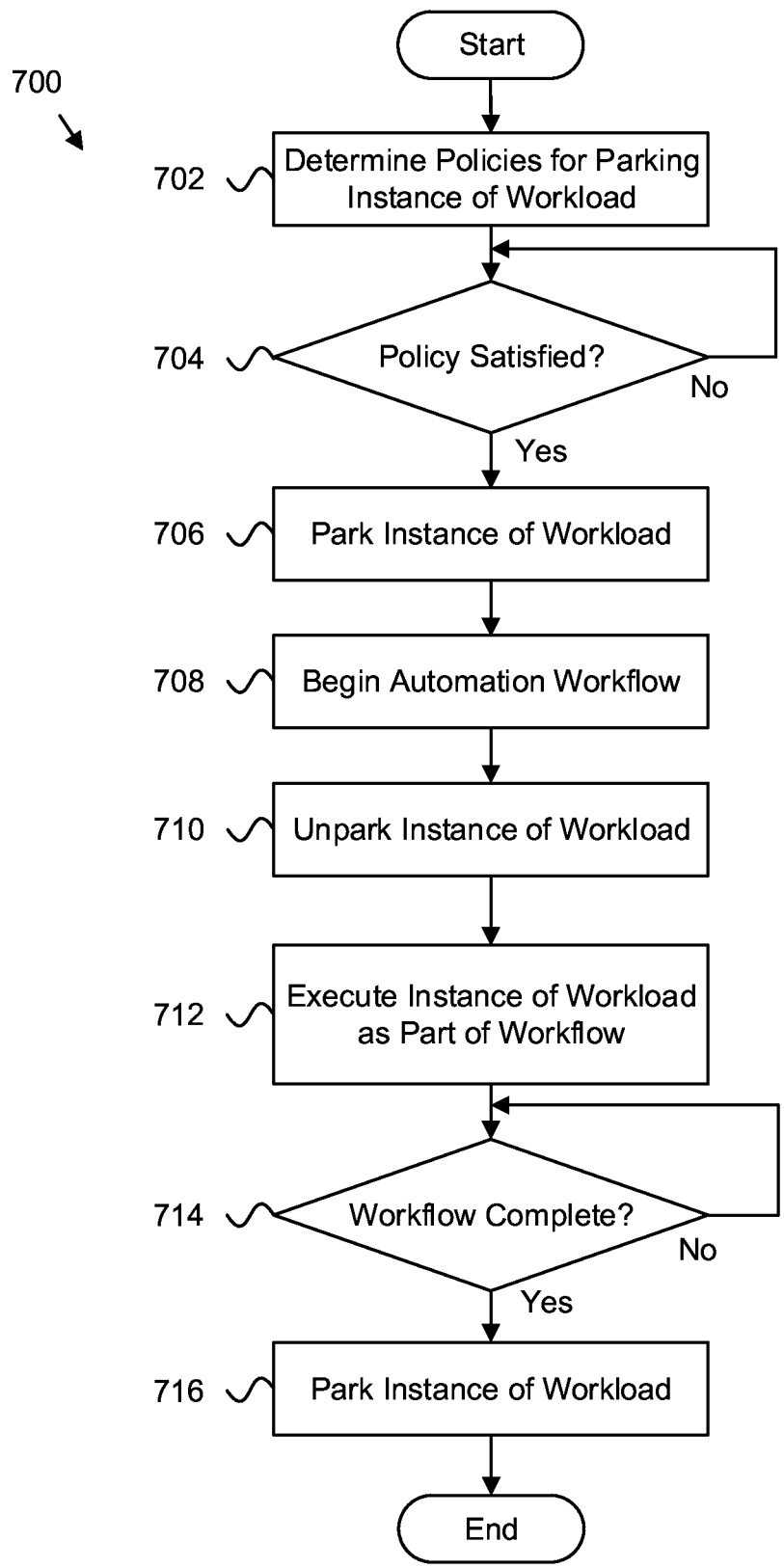
FIG. 7 is a schematic flow chart diagram of one embodiment of another method for workload management and distribution.

FIG. 7 is a schematic flow chart diagram illustrating one embodiment of a method 700 for workload management and distribution. In one embodiment, the method 700 begins and determines 702 one or more policies for parking an (virtual) instance of a workload from a first computing (virtual) environment to a second computing (virtual) environment. In certain embodiments, the method 700 determines 704 whether one or more conditions of the policy have been satisfied. For instance, the method may actively monitor resource usage times, costs, inactivity times, and/or the like to determine if the monitored values satisfy one or more parking thresholds defined in the policies for the workload. If not, the method continues to determine 704 whether the policy conditions have been satisfied.

Otherwise, the method 700 parks 706 an instance of the workload in a repository. The method 700, in some embodiments, begins 708 an automated workflow in the second computing environment. The method 700, in certain embodiments, unparks 710 the instance of the workload from the repository in the second computing environment, e.g., the method 700 provisions, configures, and executes 712 the workload (e.g., a virtual machine, a virtual container, and/or the like) in the second computing environment as part of the automated workflow.

The method 700 determines 714 whether the automated workflow is complete, e.g., whether the task that the workflow is designed to perform is complete. If not, the method 700 continues to determine 714 whether the workflow is complete. Otherwise, the method 700 parks 716 the instance of the workload, and the method 700 ends. In some embodiments, the parking module 402, the request module 404, the unparking module 406, the policy module 502, and the workflow module 504 perform one or more steps of the method 700.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   parking a virtual instance of a workload in a repository in response to detecting one or more triggers defined by a policy associated with the workload, each of the one or more triggers associated with a method for parking the virtual instance of the workload such that when certain triggers are detected the workload is powered-off and when different triggers are detected a restore point for the workload is created, the workload executing in a first virtual environment that is configured with a first set of execution parameters prior to being parked;
   determining one or more applications that are required to complete a predefined automated workflow;
   determining one or more virtual instances of workloads parked in the repository that comprise applications for completing the predefined automated workflow;
   receiving, as part of the predefined automated workflow that is scheduled to execute according to a predefined policy, a request to unpark the one or more virtual instances of the workloads from the repository to a second virtual environment;
   dynamically unparking the one or more virtual instances of the workloads at the second virtual environment during execution of the workflow, the second virtual environment configured with a second set of execution parameters that are different than the first set of execution parameters, the one or more virtual instances of the workloads being unparked at the second virtual environment using the second set of execution parameters such that the unparked virtual instance of the workload retains its operating state from the first virtual environment;
   executing, as defined by the workflow, one or more applications in the one or more virtual instances of the workloads at the second virtual environment;
   processing results from the one or more applications executed in the one or more virtual instances of the workloads at the second virtual environment;
   dynamically configuring execution of the workflow for future executions of the workflow based on the application results; and
   dynamically parking the one or more virtual instances of the workloads in the repository in response to the workflow being complete.

2. The method of claim 1, wherein parking the virtual instance of the workload consists of one of:
   powering-off the virtual instance of the workload;
   saving one or more incremental recovery points of the virtual instance of the workload while the workload continues to execute; and
   saving a copy of the virtual instance of the workload and deleting the executing virtual instance of the workload.

3. The method of claim 1, wherein unparking the virtual instance of the workload consists of one of:
   powering-on the powered-off virtual instance of the workload;
   restoring the virtual instance of the workload from an incremental recovery point; and
   restoring the virtual instance of the workload from a saved and deleted virtual instance of the workload.

4. The method of claim 1, wherein parking the virtual instance of the workload is performed in response to one or more of:

user input commanding parking of the virtual instance of the workload;
a predetermined schedule; and
a predefined policy.

5. The method of claim 4, wherein the one or more triggers consist of detecting one or more of:
the workload is inactive for a predefined amount of time;
a user logged-off from the workload;
a cost threshold for a predetermined amount of time is satisfied;
a processing threshold for a predetermined amount of time is satisfied;
a memory threshold for a predetermined amount of time is satisfied; and
a storage threshold for a predetermined amount of time is satisfied.

6. The method of claim 4, wherein a plurality of policies may be associated with the virtual instance of the workload, each policy having an assigned priority that defines an order in which each policy is applied for parking the virtual instance of the workload.

7. The method of claim 1, wherein the virtual instance of the workload consists of one of:
a virtual machine;
a virtual container;
an operating system; and
an application.

8. The method of claim 1, further comprising encrypting one or more of the parked virtual instance of the workload and data associated with the parked virtual instance of the workload.

9. The method of claim 1, wherein the first and second execution parameters consists of one or more of:
different hypervisors;
different physical servers;
different operating systems;
different software and hardware configurations; and
different cloud infrastructures.

10. The method of claim 1, further comprising configuring the parked virtual instance of the workload to execute on the second virtual environment by translating one or more properties of the virtual instance of the workload that are incompatible with the second virtual environment to one or more compatible properties of the second virtual environment.

11. A system comprising:
a first virtual environment configured with a first set of execution parameters;
a second virtual environment configured with a second set of execution parameters that are different than the first set of execution parameters;
a repository for storing virtual instances of workloads, the repository communicatively coupled to the first virtual environment and the second virtual environment; and
an apparatus comprising:
a park module that parks a virtual instance of a workload executing on the first virtual environment in the repository in response to detecting one or more triggers defined by a policy associated with the workload, each of the one or more triggers associated with a method for parking the virtual instance of the workload such that when certain triggers are detected the workload is powered-off and when different triggers are detected a restore point for the workload is created;
a workflow module that:
determines one or more applications that are required to complete a predefined automated workflow; and
determines one or more virtual instances of workloads parked in the repository that comprise applications for completing the predefined automated workflow;
a request module that receives, as part of the predefined automated workflow that is scheduled to execute according to a predefined policy, a request to unpark the one or more virtual instances of the workloads from the repository to a second virtual environment; and
an unpark module that dynamically unparks the virtual instances of the workloads at the second virtual environment during execution of the workflow using the second set of execution parameters such that the unparked virtual instance of the workload retains its operating state from the first virtual environment,
wherein the workflow module executes the predefined automated workflow using the unparked one or more virtual instances of the workloads at the second virtual environment, the predefined automated workflow consisting of:
executing, as defined by the workflow, one or more applications in the one or more virtual instances of the workloads at the second virtual environment;
processing results from the one or more applications executed in the one or more virtual instances of the workloads at the second virtual environment;
dynamically configuring execution of the workflow for future executions of the workflow based on the application results; and
dynamically parking the one or more virtual instances of the workloads in the repository in response to the workflow being complete, and
wherein said modules comprise one or more of hardware circuits, programmable hardware devices, and a processor executing code.

12. The system of claim 11, wherein the park module parks the virtual instance of the workload by one of:
powering-off the virtual instance of the workload;
saving one or more incremental recovery points of the virtual instance of the workload while the workload continues to execute; and
saving a copy of the virtual instance of the workload and deleting the executing virtual instance of the workload.

13. The system of claim 11, wherein the unpark module unparks the virtual instance of the workload by one of:
powering-on the powered-off virtual instance of the workload;
restoring the virtual instance of the workload from an incremental recovery point; and
restoring the virtual instance of the workload from a saved and deleted virtual instance of the workload.

14. The system of claim 11, wherein the park module parks the virtual instance of the workload in response to one or more of:
user input commanding parking of the virtual instance of the workload;
a predetermined schedule; and
a predefined policy.

15. The system of claim 14, further comprising a policy module, the policy module generating one or more policies that define the one or more triggers for parking the virtual instance of the workload, the one or more triggers consisting of detecting that:

the workload is inactive for a predefined amount of time;
a user logged-off from the workload;
a cost threshold for a predetermined amount of time is satisfied;
a processing threshold for a predetermined amount of time is satisfied;
a memory threshold for a predetermined amount of time is satisfied; and
a storage threshold for a predetermined amount of time is satisfied.

16. The system of claim 11, further comprising a translation module, the translation module configuring the parked virtual instance of the workload to execute on the second virtual environment by translating one or more properties of the virtual instance of the workload that are incompatible with the second virtual environment to one or more compatible properties of the second virtual environment.

17. A program product comprising a computer readable storage medium that stores code executable by a processor, the executable code comprising code to perform:

parking a virtual instance of a workload in a repository in response to detecting one or more triggers defined by a policy associated with the workload, each of the one or more triggers associated with a method for parking the virtual instance of the workload such that when certain triggers are detected the workload is powered-off and when different triggers are detected a restore point for the workload is created, the workload executing in a first virtual environment that is configured with a first set of execution parameters prior to being parked;

determining one or more applications that are required to complete a predefined automated workflow;

determining one or more virtual instances of workloads parked in the repository that comprise applications for completing the predefined automated workflow;

receiving, as part of the predefined automated workflow that is scheduled to execute according to a predefined policy, a request to unpark the one or more virtual instances of the workloads from the repository to a second virtual environment;

dynamically unparking the one or more virtual instances of the workloads at the second virtual environment during execution of the workflow, the second virtual environment configured with a second set of execution parameters that are different than the first set of execution parameters, the one or more virtual instances of the workloads being unparked at the second virtual environment using the second set of execution parameters such that the unparked virtual instance of the workload retains its operating state from the first virtual environment;

executing, as defined by the workflow, one or more applications in the one or more virtual instances of the workloads at the second virtual environment;

processing results from the one or more applications executed in the one or more virtual instances of the workloads at the second virtual environment;

dynamically configuring execution of the workflow for future executions of the workflow based on the application results; and dynamically parking the one or more virtual instances of the workloads in the repository in response to the workflow being complete.

* * * * *